United States Patent [19]
Allen

[11] 3,848,448
[45] Nov. 19, 1974

[54] MACHINE DRIVE
[75] Inventor: Robert H. Allen, Barre, Mass.
[73] Assignee: Charles G. Allen Company, Barre, Mass.
[22] Filed: May 10, 1973
[21] Appl. No.: 359,204

[52] U.S. Cl. .............................................. 74/242.4
[51] Int. Cl. .............................................. F16h 7/08
[58] Field of Search ..................... 74/242.4, 242.3

[56] References Cited
UNITED STATES PATENTS
1,452,044  4/1923  Hausman et al. ................. 74/242.4
1,717,506  6/1929  Goodactive ....................... 74/242.4
2,263,438  11/1941 Garvin ............................. 74/242.4
2,377,697  6/1945  Kenworthy ....................... 74/242.4

Primary Examiner—Leonard H. Gerin
Attorney, Agent, or Firm—Norman S. Blodgett; Gerry A. Blodgett

[57] ABSTRACT

A machine drive including conical pulleys in which a belt is moved from one portion of the pulley to another to change speed.

10 Claims, 8 Drawing Figures 3,848,448

MACHINE DRIVE

BACKGROUND OF THE INVENTION

In the design and construction of machine tools, a commonly-encountered problem is that of changing the speed of the drive spindle. In some cases gear-changing transmissions are used, but these are very expensive and are, therefore, limited to situations where no other type of drive would be adequate for power transmittal. When the power transmittal permits it, it is common practice to use conical, stepped pulleys with V-belts extending between them. The speed is changed by moving the V-belt from one set of steps of the pulleys to another. Such V-belt drives have a number of advantages, not the least of which is that slippage of the belt on occasion can provide for an overload safety feature. It is quiet, smooth, no lubrication is needed, the repairs are inexpensive (simply replace belt with a new one). There are, however, a number of disadvantages; one of them is the fact that the use of belt drives can be unsafe for the operator, particularly if he has to change the belt by hand. Also, it is easy to change the belt when the pulleys are running and there is a temptation for the operator to do this very dangerous operation. Automatic means have been evolved over the years for changing belts from one portion of the conical pulleys to another, but most of these have not only been complicated and expensive and subject to breakdown and mis-operation, but also, when they do not operate properly, there is a temptation for the operator to correct the improper operation with this hands. These and other difficulties experienced with the prior art devices have been obviated in a novel manner by the present invention.

It is, therefore, an outstanding object of the invention to provide a machine drive in which the speed can be changed from a location exterior of the drive and without the intervention of the machine tool operator in the hazardous area.

Another object of this invention is the provision of a machine drive whose speed change can take place from a remote position, so that, when the drive is installed in a high machine tool, there is no necessity for the operator to climb up on a ladder.

A further object of the present invention is the provision of a machine drive of the conical-pulley, V-belt type which is very safe in operation, since there is no need for operator intervention.

It is another object of the present invention to provide a machine drive in which the correct speed of operation may easily be selected by the operator without the possibility of his obtaining an undesirable speed by placing the belts on the wrong steps of the pulleys.

A still further object of the invention is the provision of a machine tool drive which is simple in construction, easy to operate, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a machine drive having a main body on which are rotatably mounted a first pulley and on which is mounted a secondary body. The secondary body is mounted for movement in a plane perpendicular to the axis of the first pulley and a second pulley is rotatably mounted on the secondary body. The first and second pulleys have surfaces that are of the conical, step-type which taper in opposite directions. A belt frame is movably mounted on the secondary body for movement relative thereto in a direction lying at the same angle as the surfaces of the pulleys.

More specifically, the secondary body and the belt frame move toward the first pulley to loosen the belt relative to the said first pulley and a belt guide means is mounted on the first pulley to engage the belt and to resist complete movement of the belt as the frame moves so that the belt is also loosened from the second pulley.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
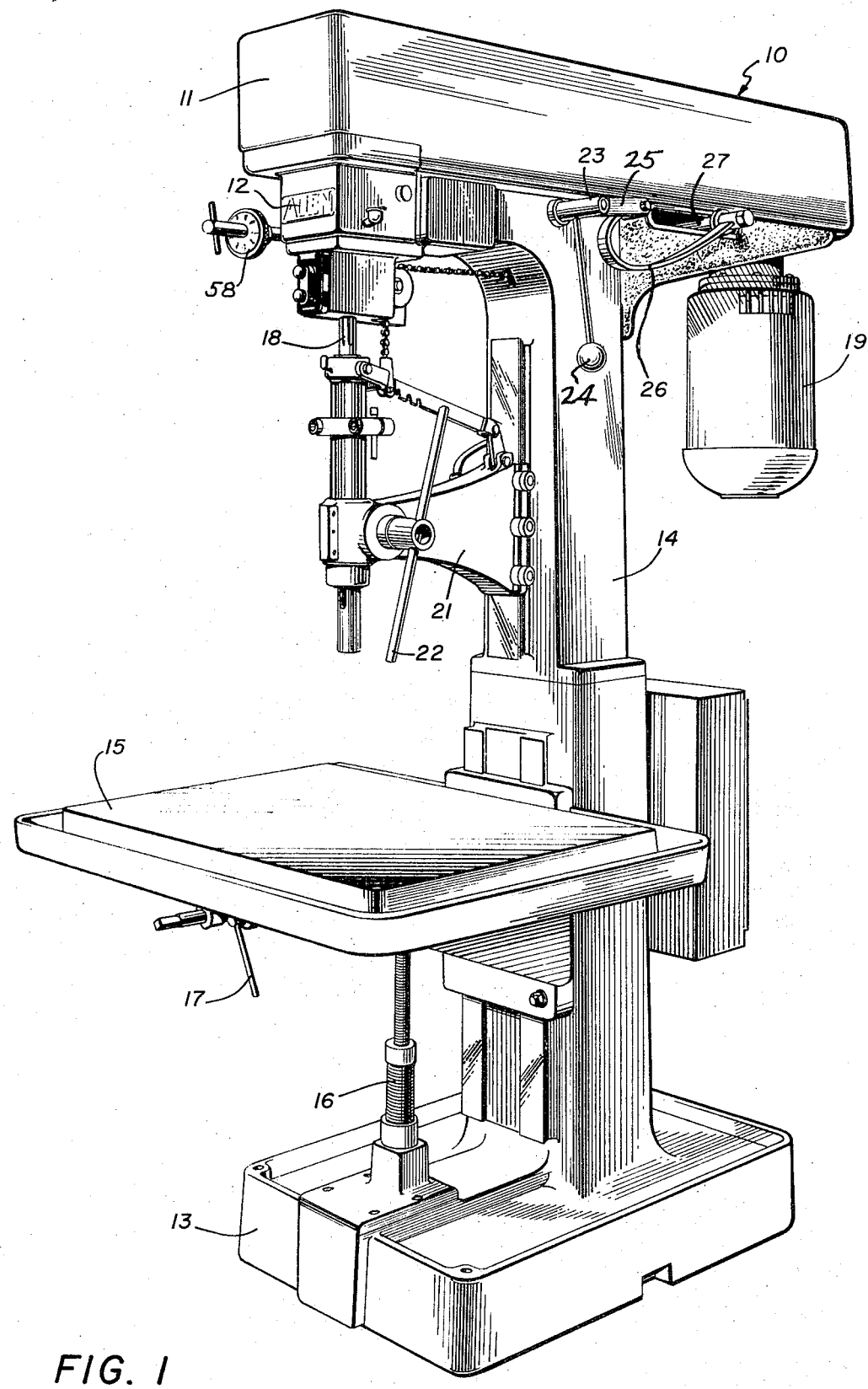
FIG. 1 is a perspective view of a machine tool incorporating the machine drive constructed in accordance with the principles of the present invention.

Referring first to FIG. 1, wherein are best shown the general features of the invention, the machine drive, indicated generally by the reference numeral 10, is shown as enclosed in a housing 11 mounted at the upper end of a machine tool 12. For the purposes of illustration, the machine tool 12 is shown as being a single-spindle, heavy-duty, drilling-and-tapping machine. It is provided with a base 13 from which extends a vertical column 14 on which is slidably mounted a workpiece supporting table 15. The table is vertically adjusted by means of a screw 16 and is locked in place by a handle 17. Mounted at the upper end of the column 14 is a rotatable spindle 18 which is driven through the machine drive 10 by an electric motor 19. Mounted on the intermediate portion of the column 14 is a vertically slidable abutment 21 in which is mounted a pinion handle 22 to produce vertical movement of the spindle 18.

In the description which follows the expressions "front," "rear," "right" and "left" refer to those portions of the machine as they relate to an operator standing in front of the table 15 and facing the machine.

Extending from the right side of the upper portion of the column 14 is a pivot shaft 23, from which extends radially a control handle 24. Also extending radially from the shaft 23 is a crank arm 25 attached at its free end to one end of a C-shaped leaf spring 26, the other end of which is attached to a shaft 27 extending horizontally from the machine drive 10.

Figure 2:
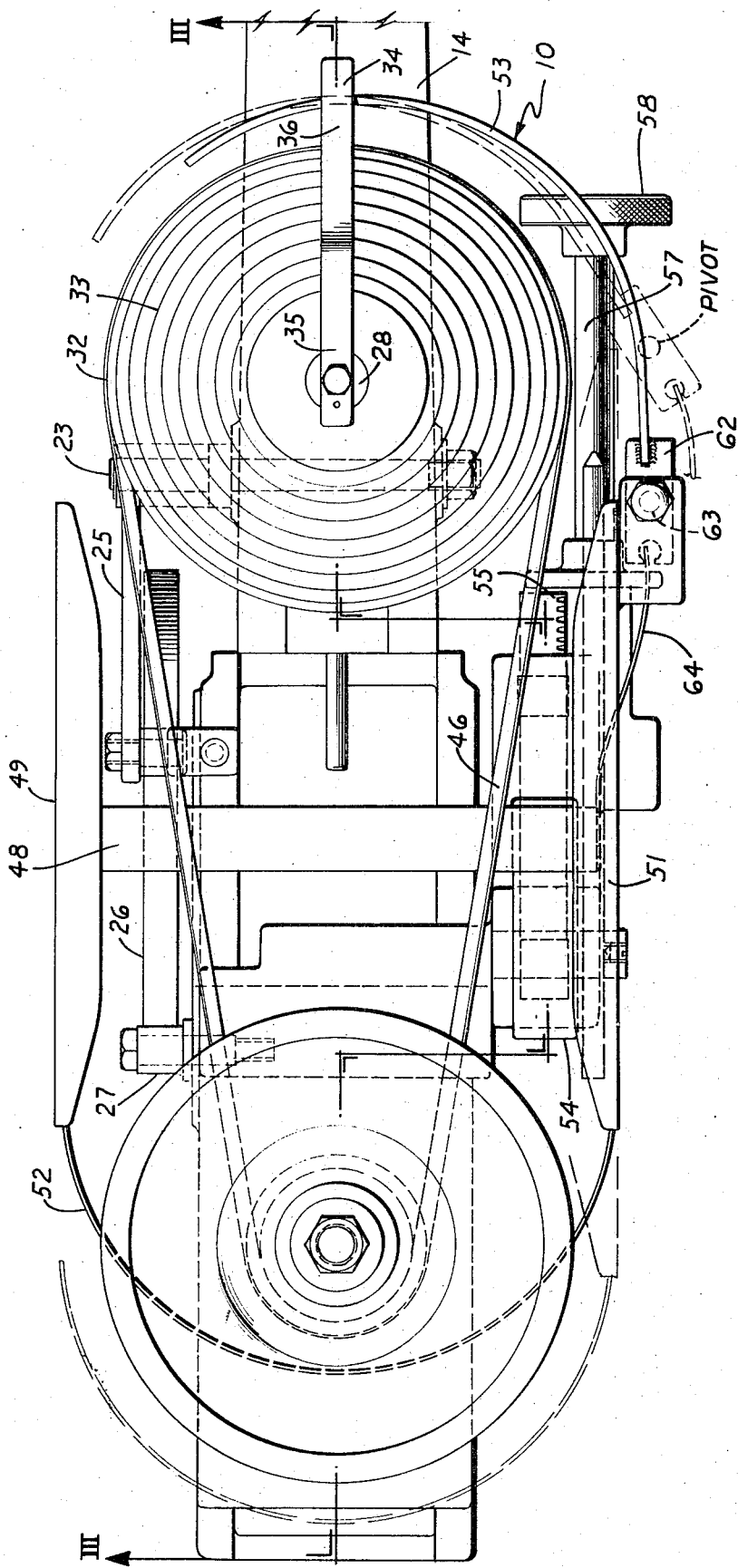
FIG. 2 is a plan view of the machine drive.
Figure 3:
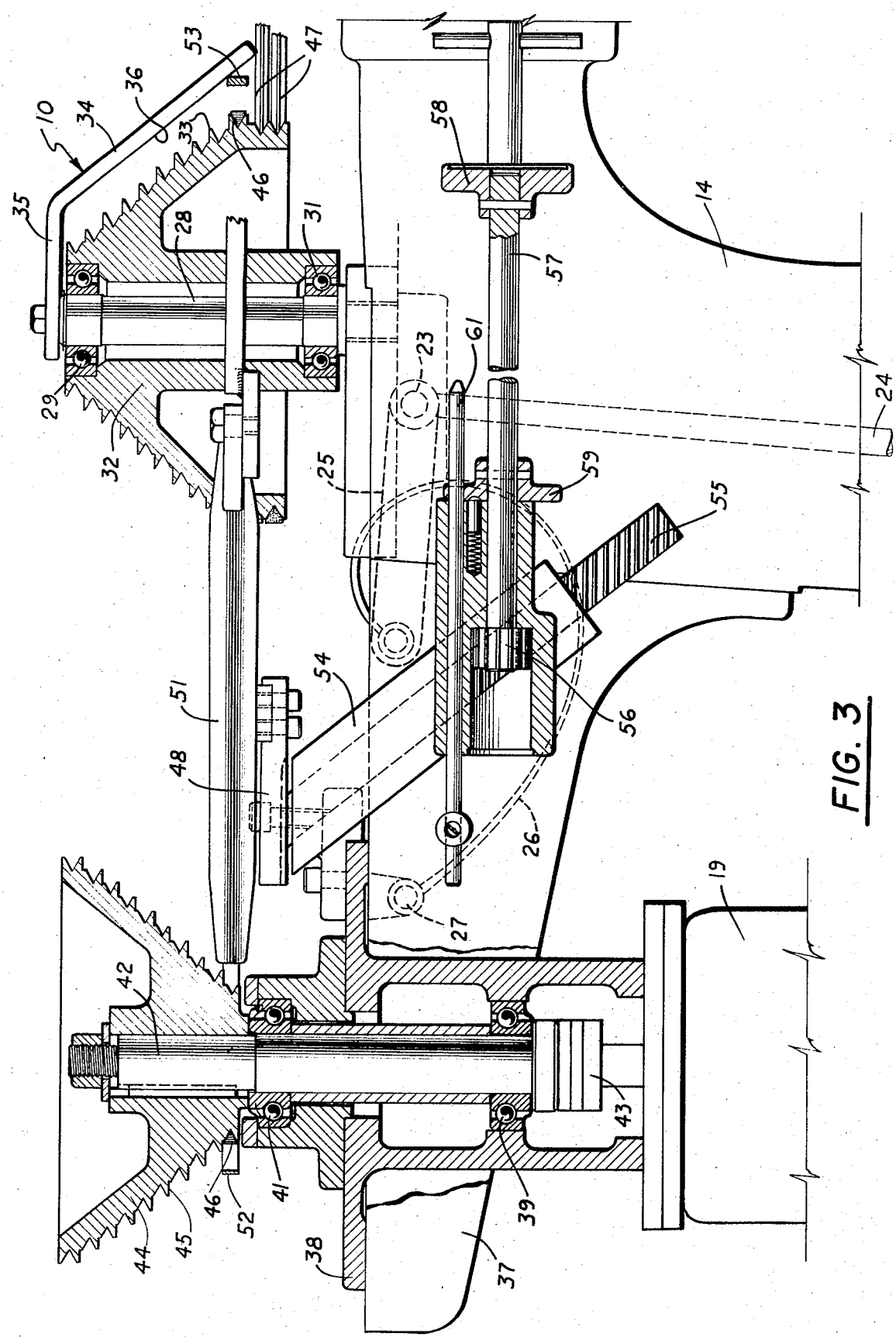
FIG. 3 is a vertical sectional view of the machine drive taken on the line III—III of FIG. 2.
Figure 4:
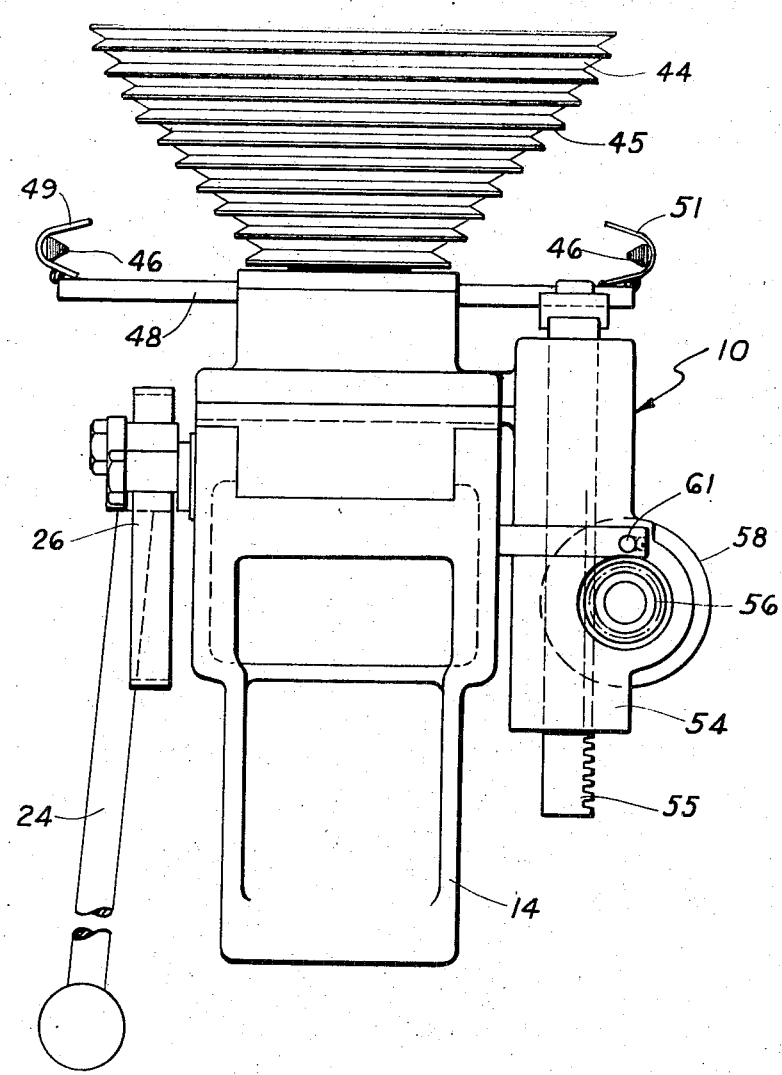
FIG. 4 is an end elevational view of the machine drive taken from the rear of the machine tool.

Referring next to FIGS. 2, 3, and 4, which show the details of the machine drive 10, the plan view shown in FIG. 2 is with the rear part of the drive located at the bottom of the view, while in FIG. 3 the view is a section taken from the left side of the machine and FIG. 4 shows the machine drive as viewed from the rear of the machine. The housing 11 has been removed for ease in description.

Extending upwardly from the upper end of the column 14, is a fixed vertical shaft 28 carrying ball bearings 29 and 31. Mounted on these bearings is a first pulley 32, having an outer surface 33 which is of the generally conical, stepped type with the small end of the cone at the top. Bolted to the shaft 28 and not taking part in the rotative movement of the pulley 32, is a belt guide 34 which has a first horizontal portion 35 which is connected to an inclined portion 36 whose angle of inclination is the same as that of the surface 33 of the pulley, so that it is parallel to and spaced from a generatrix of the cone of the pulley.

The upper end of the column 14 has bolted to it a rearwardly-extending abutment 37 on which is mounted (for sliding motion from the front to the rear of the machine tool), a secondary body 38 carrying at its lower end the motor 19. Internally of the body 38 are carried ball bearings 39 and 41 and in these bearings is rotatably carried a vertical shaft 42, whose lower end is connected by a coupling 43 to the rotatable shaft of the motor 19. At its upper end the shaft 42 carries a second pulley 44 having a surface 45 which is generally conical and provided with stepped grooves for a V-belt in a manner similar to the first pulley 32, but with the taper arranged with the small end downward. Extending around the two pulleys is a V-belt 46, while the lower end of the first pulley 32 is provided with extra grooves which operate through V-belts 47 to drive the spindle 18 of the machine tool.

Means is provided for moving the belt 46 horizontally and vertically from one place to another on the pulleys 32 and 44. This means includes a belt frame 48 which is movably mounted on the secondary body 38 for movement relative thereto in a plane lying at the critical angle of the surfaces 33 and 45 of the pulleys 32 and 44, respectively, and also parallel to the inclined portion 36 of the belt guide 34. The belt frame includes two opposed, straight horizontal side guides 49 and 51 which (as is best evident in FIG. 4) are U-shaped in cross-section to enclose the side runs of the belt 46. Extending from the side guide 49 to the side guide 51 at the rear of the machine is a U-shaped metal band 52, while a similar U-shaped band 53 connects the other ends of the side guides 49 and 51.

Bolted to the top of the secondary body 38 is an inclined housing 54 in which is slidably carried a rack 55. Its upper end is bolted to the belt frame 48. As is evident in FIG. 3, the rack 55 has gear teeth extending horizontally, while the rack itelf extends at the critical angle (which is described above) which is also the angle of the inclined portion 36 of the belt guide 34. Engaging this rack is a pinion gear 56 which is rotatably carried in the housing 54 and which is provided with a shaft 57 whose forward end carries knob 58. Mounted on the shaft 57, between the knob 58 and the gear 56, is an indexing element 59 having a radially-extending flange which is provided with a number of horizontal bores at small angular spacing. Extending through the housing 54 is a locking rod 61 which extends through a bore in the indexing element 59 to lock the shaft 57 against rotation under normal conditions. The rod 61 is bolted to the side of the abutment 37 forming part of the main body of the machine tool.

The operation of the apparatus will now be readily understood in view of the above description. When the electric motor 19 is energized by the usual switching arrangement on the machine tool 12, the motor 19 drives the pulley 44 which operates through the belt 46 to drive the pulley 32. The pulley 32, in turn, operates through the belts 47 to drive the spindle 18 of the machine tool for the machining operation. When it is desired to change the speed of the spindle 18, the motor 19 is first de-energized and then the handle 24 is moved upwardly into a horizontal position. Since the C-shaped leaf spring 26 and the crank arm 25 act as a toggle, the effect of lifting the handle 24 into the horizontal position is to reverse the pressure of the spring 26 on the shaft 27. Since the only thing that holds the secondary body 38 to the rear of its sliding range on top of the abutment 37 is this spring pressure, a reversal of spring pressure in the leaf spring 26 causes the secondary body 38 to move forwardly on the machine so that the pulley 44 is brought closer to the pulley 32. This causes the belt 46 to be loose on the pulley and to be supported entirely by the side guides 49 and 51. The natural resilience of the V-belt 46 causes it to take approximately the shape of an ellipse with straight sides. It not only resides tightly in the side guides 49 and 51, but presses tightly at its ends against the bands 52 and 53. The band 53 is pressed tightly against the inside surface of the inclined portion 36 of the belt guide 34 and the belt is, therefore, forced rearwardly of the machine into tight engagement with the band 52. Once the belt has been loosened and expanded outwardly against the enveloping surfaces of the belt frame 48, it is possible to move it to another position along the pulleys. For this purpose, the forward movement of the body 38 has removed the indexing rod 61 from the bore in the indexing element 59, so that it is now possible to rotate the shaft 57. When this is done the gear 56 operates on the rack 55 to move the entire belt frame 48 up or down. It also moves it at an angle, so that the fully-expanded belt is fully centered on the pulleys at all times and does not contact the pulleys as it moves from one position to another. The knob 58 carries indicia on its face which show the speeds to which the apparatus is being changed. When the desired new position is reached, the handle 24 is pulled downwardly to move the secondary body 38 rearwardly and tighten up the belt at that position on the pulleys. When handle 24 is pulled down the toggle goes over center and locks with continuous pressure on the secondary body. This also causes the indexing rod 61 to extend through the most adjacent, exactly aligned bore in the indexing element 59 to lock the belt frame 48 in the selected position. The handle 24 cannot be pulled down unless the indexing element is in the proper position.

Figure 5:
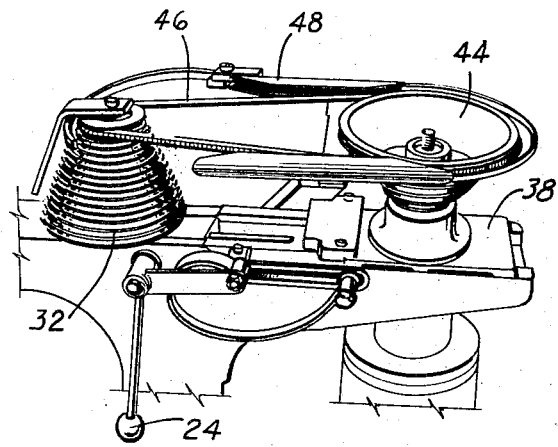
FIGS. 5–8 are perspective views of the machine drive showing it in various conditions during a speed change.
Figure 6:
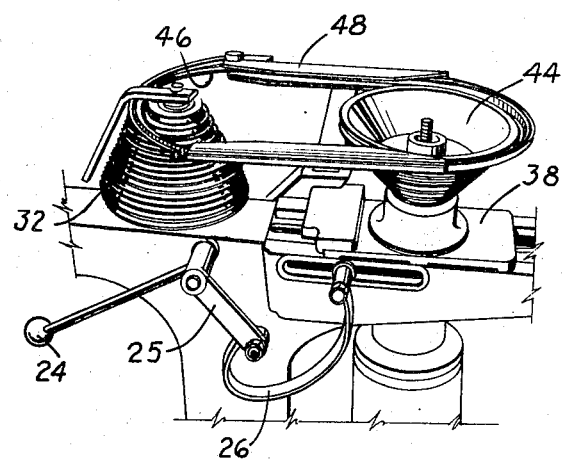

Referring to FIGS. 5, 6, 7, and 8, it can be seen that FIG. 5 shows the machine drive in an operative position with the belt 46 at the tops of the pulleys 32 and 44. This would give a fast speed of rotation of the spindle 18. In FIG. 6 the handle has been moved upwardly, thus loosening the toggle represented by the crank arm and the leaf spring 26, so that the secondary body 38 can move forwardly on the main body of the machine. When this happens, of course, the belt 46 is loose and is expanded outwardly against the surfaces of the belt frame 48. Note that in FIG. 7 the locking rod 61 is not in engagement with the indexing element 59, so that the rotation of the knob 58 moves the belt frame 48 downwardly carrying the belt 46 with it. When the belt has been lowered to another position (which would give a slower speed of rotation of the spindle 18) and if the belt is properly aligned with the steps of the pulleys the index plate 59 will allow the indexing rod 61 to enter its exactly aligned hole and allow the handle 24 to be pulled downwardly again, thus moving the secondary body 38 rearwardly of the machine and causing the belt 46 to engage the pulleys.

Figure 7:
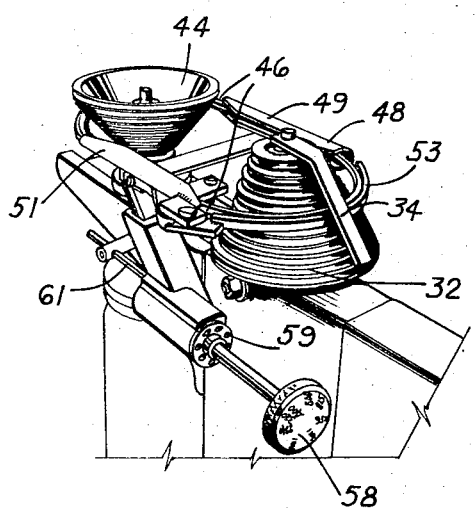
Figure 8:
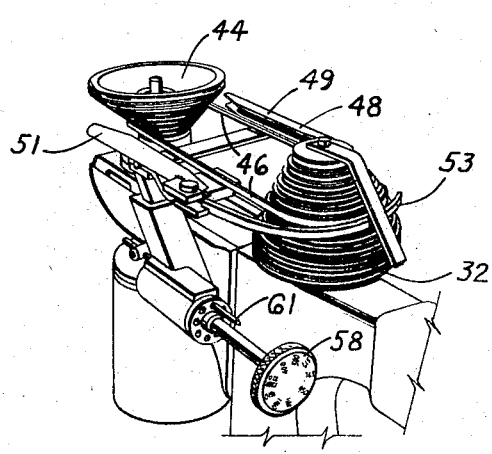

It should be noted, as is best shown in FIGS. 7 and 8, that the band 53 which is associated with the front end of the machine drive, is not attached to the side guide 49, but only to the side guide 51, so that as the belt frame 48 moves up and down the band 53 is pivoted more or less by its engagement with the belt guide 34. This pushes the belt rearwardly as the frame moves vertically upwardly so that the belt cannot engage the grooves on the surface 45 of the rear pulley 44. The manner in which the band 53 is attached to the side guide 51 is shown in FIG. 2. The end of the band is mounted in a block 62, which is pivotally carried by means of a pivot pin 63 on a block fastened to the side guide 51. A leaf spring 64 biases the block 62 and the band 53 outwardly at all times. This bias is overcome, of course, by engagement of the band 53 with inner surface of the incline portion 36 of the belt guide 34.

The advantage of the present invention can be readily understood in view of the above description. In a tall drill press or similar machine tool, the belts are high above the floor, sometimes as much as 7 or 12 feet. It is not only dangerous for the operator to climb up to change the belts, but he resists doing so. This brings about a tendency to use the wrong speed for a given machine operation. Also there is a tendency to stand on the table 15, which is usually slippery with cutting oil. In the present case the operation of changing the speed can take place simply by operating the handle 24 and then making the adjustment by means of a knob 58 on the shaft 57. There is no need for the operator to remove the housing 11 from the machine drive and, yet, an absolutely correct speed is obtained. Preferably, the speeds are arranged in a desirable geometric progression. This means less "down time" between jobs to change speed. Because of the simple and rugged nature of the construction, there will be no down time due to damage to the equipment or to mis-operation of the speed-changing apparatus. The unusual leaf spring 26, not only acts as a toggle with the crank arm 25, but also maintains the correct tension in the belt despite wear on the belt. It also compensates for tracking error in the pulleys. It should be understood also that the speed can be changed while the pulleys are still running, although the preferable situation is to stop the motor 19 before making the speed change. The drive can run in either direction also. The inter-lock provided by the locking pin 61 and the indexing element 59 prevents changing speed while the belt is tight. Also it guarantees that the belt is aligned with the proper grooves on the pulley, otherwise, the pin 61 cannot enter the proper bore in the indexing element 59.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine drive, comprising
   a. a main body,
   b. a first pulley rotatably mounted on the main body,
   c. a secondary body movably mounted on the main body for movement in a plane perpendicular to the axis of the first pulley,
   d. a second pulley rotatably mounted on the secondary body, the first and second pulleys having surfaces that are of the conical, stepped type tapering in opposite directions, and
   e. a belt frame movably mounted on the secondary body for movement relative thereto in a plane lying at the angle of the surfaces of the pulleys,
   the belt belt frame and the second pulley being movably mounted on the secondary body for movement toward the first pulley to loosen a belt relative to the first said pulley.

2. A machine drive as recited in claim 1, wherein a belt guide is mounted on the said first pulley to engage the belt and to resist complete movement of the belt as the frame moves, so that the belt is also loosened from the second pulley.

3. A machine drive as recited in claim 2, wherein the belt guide includes an inclined portion extending parallel to and spaced from the surface of the first pulley, the belt frame including a pivotable band which engages the said inclined portion of the belt guide to pivot the band as the belt frame is moved vertically.

4. A machine drive as recited in claim 3, wherein the belt frame is mounted at the upper end of an inclined rack which is slidably mounted in a housing on the main body.

5. A machine drive as recited in claim 4, wherein a gear is rotatably mounted in the said housing for engagement with the rack, the gear being mounted on one end of a shaft whose other end carries an adjusting knob bearing indicia indicative of the various speeds of the drive.

6. A machine drive as recited in claim 5, wherein the shaft carries a radially-extending indexing element having bores which are engaged by a locking rod mounted in the housing.

7. A machine drive as recited in claim 6, wherein the belt frame includes U-shaped side guides joined at one end by another band, the first-named band being pivotally attached to one end of one side guide and biased by a leaf spring into contact with the inclined portion of the belt guide.

8. A machine drive as recited in claim 6, wherein an actuating handle extends from a shaft rotatably mounted in the main body, the shaft and the secondary body being joined by a crank arm and a C-shaped leaf spring to move the secondary body and the second pulley to an extreme position in which the V-belt engages both pulleys tightly.

9. A machine drive, comprising
   a. a main body,
   b. a first V-belt pulley rotatably mounted on the main body,
   c. a secondary body movably mounted on the main body for movement in a plane perpendicular to the axis of the first pulley, to selectively tighten or loosen a belt passing over the pulleys,
d. a second V-belt pulley rotatably mounted on the secondary body, the first and second pulleys having surfaces that are of the conical, stepped type tapering in opposite directions, and
e. a belt frame movably mounted on the secondary body for movement relative thereto in a plane lying at the angle of the surfaces of the pulleys, while maintaining the belt parallel to the plane perpendicular to the axis of the first pulley.

10. A machine drive, comprising
a. a main body,
b. a first pulley rotatably mounted on the main body,
c. a secondary body movably mounted on the main body for movement in a plane perpendicular to the axis of the first pulley,
d. a second pulley rotatably mounted on the secondary body, the first and second pulleys having surfaces that are of the conical, stepped type tapering in opposite directions, and
e. a belt frame movably mounted on the secondary body for movement relative thereto in a plane lying at the angle of the surfaces of the pulleys, the belt frame and the second pulley being mounted on the secondary body for movement with the secondary body toward the first pulley to loosen a belt relative to the first said pulley.

* * * * *